E. CRAWLEY & F. THOMAS.
MACHINES FOR ROUNDING AND BACKING BOOKS.

No. 184,198. Patented Nov. 7, 1876.

Fig. 1.

Attest
J. J. Lyon
A. D. Pease

Inventors
Edwin Crawley & Frank Thomas
per Wm. Hubbell Fisher
their atty in fact 9 Sheets—Sheet 2.

E. CRAWLEY & F. THOMAS.
MACHINES FOR ROUNDING AND BACKING BOOKS.

No. 184,198. Patented Nov. 7, 1876.

Attest
J. J. Lynn
C. A. D. Pease

Inventors
Edwin Crawley and
Frank Thomas per
Wm Hubbell Fisher
their atty in fact

E. CRAWLEY & F. THOMAS.
MACHINES FOR ROUNDING AND BACKING BOOKS.
No. 184,198. Patented Nov. 7, 1876.

E. CRAWLEY & F. THOMAS.
MACHINES FOR ROUNDING AND BACKING BOOKS.

No. 184,198.  Patented Nov. 7, 1876.

Attest
J. J. Lyon
A. D. Pease

Inventors
Edwin Crawley and Frank Thomas,
per Wm Hubbell Fisher,
their atty in fact.

E. CRAWLEY & F. THOMAS.
MACHINES FOR ROUNDING AND BACKING BOOKS.

No. 184,198. Patented Nov. 7, 1876.

Attest:
J. J. Lyon
A. D. Pense

Inventors:
Edwin Crawley and Frank Thomas
per Wm. Hubbell Fisher
their atty in fact.

E. CRAWLEY & F. THOMAS.
MACHINES FOR ROUNDING AND BACKING BOOKS.

No. 184,198. Patented Nov. 7, 1876.

Attest
J. J. Lyon
A. D. Pease

Inventors
Edwin Crawley & Frank Thomas
per Wm. Hubbell Fisher
their atty in fact

UNITED STATES PATENT OFFICE.

EDWIN CRAWLEY, OF NEWPORT, KENTUCKY, AND FRANK THOMAS, OF CINCINNATI, OHIO.

IMPROVEMENT IN MACHINES FOR ROUNDING AND BACKING BOOKS.

Specification forming part of Letters Patent No. 184,198, dated November 7, 1876; application filed July 16, 1874.

*To all whom it may concern:*

Be it known that we, EDWIN CRAWLEY, of the city of Newport, in the county of Campbell and State of Kentucky, and FRANK THOMAS, of the city of Cincinnati, in the county of Hamilton and State of Ohio, have invented certain new and useful Improvements in Machines for Rounding and Backing Books, of which the following is a specification:

Rounding a book, in bookbinders' technology, consists in causing the front or open edge of the book to assume a concave form and the back or sewed edge of the book a convex form, the concavity of the front and convexity of the back edge being seen in looking at the book from the ends. The object of rounding is to preserve the shape of the book and give to it a more graceful form.

Backing a book is the upsetting or jointing of the side edges of the back of the book. This upsetting or jointing consists in forming a raised shoulder upon said edges. These shoulders stiffen the book, aid in preserving its shape, afford a place for the reception of the binding-boards, and, to a limited extent, afford a hold-fast for the cover.

The most important features of our invention consist, first, in a new method of guiding the book, and, in certain mechanical appliances to subserve this method, whereby uniform results are obtained from rounding and backing processes. The principal feature of this new method consists in guiding the book by its back instead of by its front.

Another important feature of our invention consists in bringing the rounding-rollers directly against the sides of the book, thereby avoiding the danger of slipping or starting the sections of the book—a result which would frequently occur if the book were forced between the rollers. Thirdly, in the manner of delivering the book when backed, and in the employment of certain mechanical agencies to deliver the book in the manner proposed, so that the operator can easily and safely remove the book from the machine, thereby preventing such injury to the book as occurs when it is allowed to fall into a receptacle. Fourthly, in the employment of mechanical agencies in such a relation that, after the machine has grasped a book, it never releases its hold thereon until the operations of rounding and backing are fully completed, thereby preventing any disarrangement of the shape of the book, and also securing uniformity in the execution of the work. Fifthly, in the employment of such a combination of devices and agencies that both the rounding and backing are carried on in one machine, in a continuous operation, and, in one view, it may be said, are carried on simultaneously, as two books are usually in the machine at the same time, one being rounded while the other is being backed. In addition to the advantages mentioned in connection with the foregoing statement of the principal features of our invention, other advantages are that the curve of the round may be changed at will; also, that, as the book is guided at the back, any unevenness in previously trimming or cutting the front edges of the books, or any variation in their widths, (defects often occurring,) does not in anywise affect the perfection of the rounding and backing. Also, finally, that our machine, by reason of its devices for adjustment, is such as to be readily adapted to books of varying sizes or different qualities of paper.

The principal mechanical agencies employed to carry out the objects and purposes of our invention are, first, a guide, against which the back of the book is placed and held in proper position to be operated upon by the rounding-rollers; secondly, the device whereby the rounding-rollers are brought to bear upon the book after the latter has been placed between them and against the guide; thirdly, the rollers, which round the book by a positive revolving motion, and, at the same time, by the same motion, present it to the jaws; fourthly, a pair of jaws, adjustable according to the thickness of the book, and whose offices are to convey the book to the backing-roller, to hold it firmly while the said roller backs it, and, finally, to return it to a position whence it may be removed from the machine, and supplementary thereto a device for holding the jaws firm while the book is being backed; fifthly, a certain device, whereby a rolling motion is imparted to the upper jaw; sixthly, certain devices whereby the backing-roller is rendered capable of adjustment, so as to properly form and upset the back of any sized book; seventhly, cams and springs and other devices supplemental to these for operating various portions of the machinery; and, finally, a supplemental device of use in placing thick books against the guide, when said guide is curved.

In the accompanying drawings, making a part of this specification, Figure 1, Sheet 1, is a longitudinal vertical section of a machine embodying our improvements made through the center of the machine, except at the shaft which holds the cams, and here the section is made at the dotted lines $x\ x$ of Fig. 2, and shows that portion of the machine which is on the left-hand side, when looking at the machine from a position directly in front of it. Fig. 4$^A$, Sheet 4, is a view, in perspective, of the devices for rendering the guide adjustable to the size of the book to be rounded. Fig. 4$^B$, Sheet 4, represents a vertical section of the devices shown in Fig. 4$^A$, said section being made transversely to the length of the device, and at the dotted line Z Z of Fig. 4$^A$. Fig. 7, Sheet 5, is a detached view, in perspective, of the rounding-rollers, together with mechanism for revolving them. Fig. 11, Sheet 7, is a view, in perspective, of the jaws and the mechanism which operates them. Fig. 12, Sheet 7, is a view of the devices for enabling the jaws to properly grasp the book, hold it during the operation of backing, and at the same time impart a rolling movement to the upper jaw.

Figure 1:
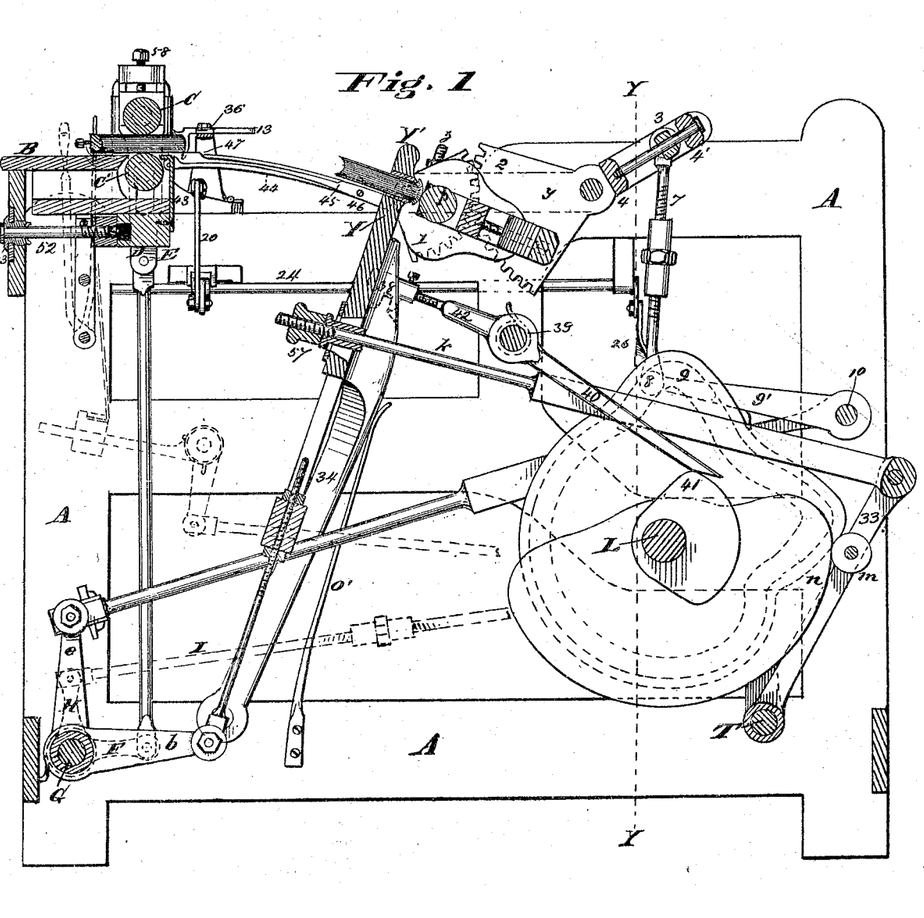

A, Fig. 1, Sheet 1, is the frame of the machine. At the top of the forward end of this frame is a table, B, (see also Fig. 20, Sheet 9,) upon which the book is laid when first introduced into the machine.

Immediately behind the table are the rounding-rollers C C', (see Fig. 1, Sheet 1, and Fig. 9, Sheet 6,) the top of roller C' being on a level with the top of the table. Fixed journal-seats I, suitably supported on the sliding carriage, described hereafter, receive the journals of roller C'.

Figures 9, 10:
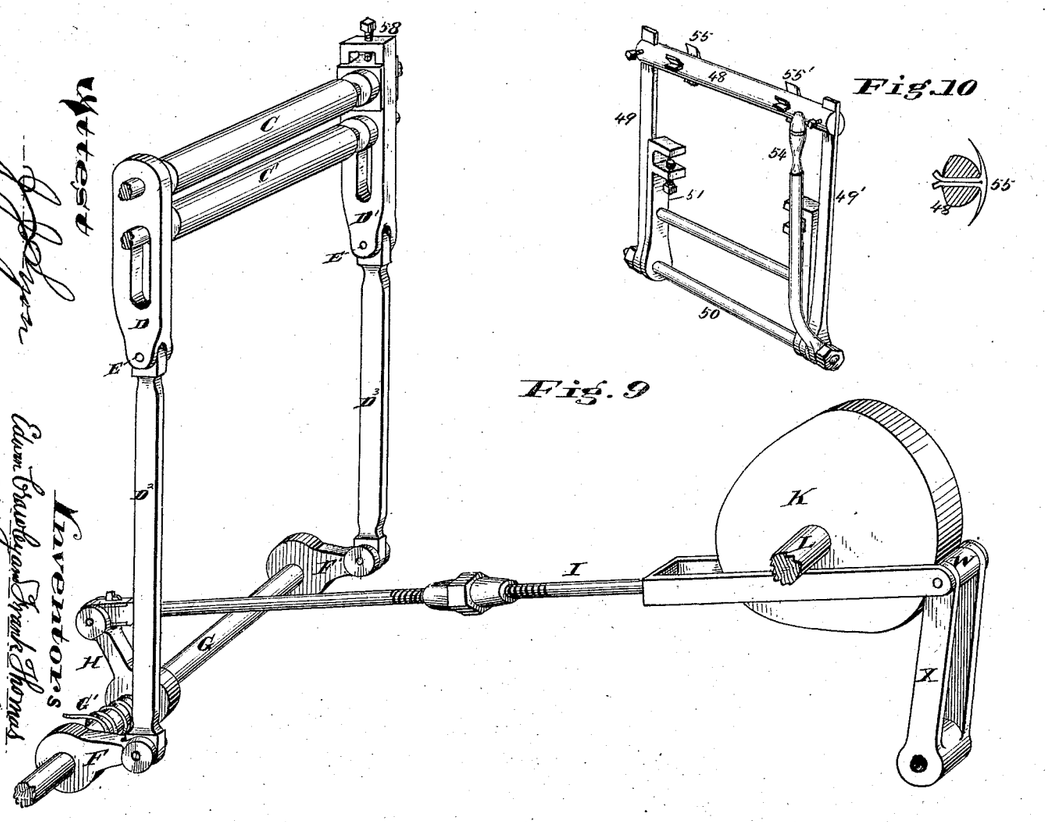
Fig. 9, Sheet 6, is a second detached view, in perspective, of the rounding-rollers, together with the operative mechanism for elevating and depressing the upper roller, and the devices for adjusting the same.
Fig. 10, Sheet 6, is a detached view, showing, in perspective, the device for pressing the center of the back of a thick book into the hollow of the guide when curved, and in section that portion of the above device which impinges against the open edge of the back.
Figure 13:
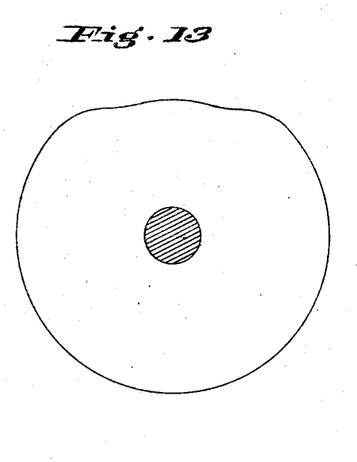
Figs. 13, 14, 15, and 16, Sheet 8, are side elevations of cams employed in driving certain of the devices of our machine. Cam, Fig. 14, causes the guide to be raised and lowered; cam, Fig. 14, causes the revolution of the rounding-rollers; cam $k$, Fig. 6, Sheet 6, and Fig. 16, Sheet 8, causes the depression of the upper roller and permits its elevation.
Figure 14:
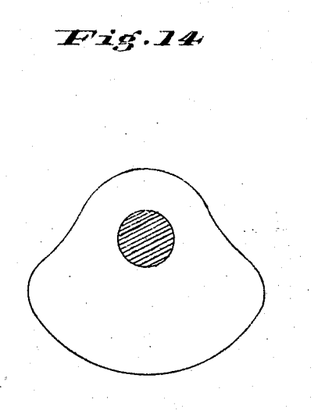
Figure 15:
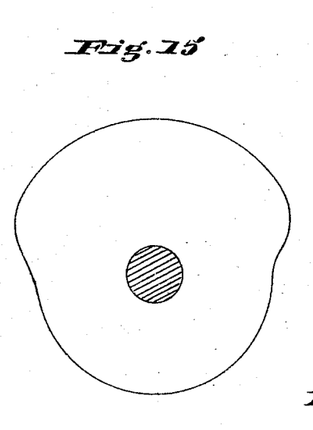
Figure 16:
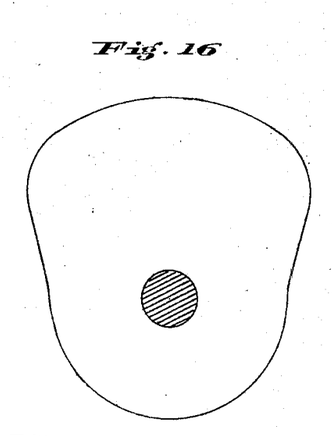

Roller C has two journals at each end. The outer two of these journals revolve in boxes placed directly above the journal-seats of roller C', sliding vertically upon guideways, thereby preventing the roller from yielding to horizontal pressure in the direction of the length of the machine, but leaving it free to yield to vertical pressure. The inner journal at either end of roller C revolves in a fixed journal-box. One of these boxes is capable of vertical adjustment by means of set-screw 58, and is fixed in the upright bar D', hinged at E to a vertical rod, D$^3$, the other end being fixed in the upright bar D, hinged at E to a vertical rod, D$^2$. The lower ends of these rods D$^2$ D$^3$ are attached to a lever, F, which in turn is fixed upon a shaft, G, journaled in the sides of the frame, and operated by a lever, H, which latter is in turn operated by a rod, I, whose length is regulated by a right and left threaded nut. Roller W, supported by rocker X on rocker-shaft T, imparts a direct movement to rod I through the agency of cam K on main driving-shaft L, and whose return movement is effected through the agency of a spiral spring coiled upon said shaft G, one end of which spring is attached to the latter, and the other end to frame A.

The revolution of rollers C C' is effected by means of a couple of straps, 31 and 32, Fig. 7, Sheet 5. The strap 31 is fastened to and wound around the roller C, and, passing over the top of this roller, thence passes over leading roller M to the sliding block N, to which it is attached. Strap 32 is attached to the roller C', and is wound around said roller in a direction the reverse of that of roller C, being passed under said roller C' and over leading roller O, and attached to sliding block N. This latter is capable of being slid along the upper arm of bent lever P, and is set at any point thereon by a set-screw. The lever P is fulcrumed at the junction of its upper and lower arms. The lower arm of lever P is operated by a rod, Q, which in turn receives its backward movement from a roller, R, supported on a rocker, S, attached at its lower end to the rocker-shaft T.

Cam U imparts direct motion, through roller R, to the rollers C C'. A coiled spring, placed near the junction of the upper and lower arms of the lever, attached at one end to the side of the machine, and at the other to the lower arm of said lever, effects the return movement of rod Q and spiral spring V upon roller C, and a spiral spring, V', upon C', effects the return revolution of the last-named rollers.

The springs in the present instance employed are spiral springs, each wound upon its respective roller, and having one end attached to its roller, and the other to the journal-seat.

The lower jaw Y, Fig. 1, Sheet 1, and Fig. 11, Sheet 7, rests upon two legs, 34, pivoted at their bottom to the frame. The upper jaw Y' rests upon rods Z Z', connected at their lower ends by a cross-bar, Z'', forming a frame. Vertical motion is communicated to this frame by rod $a$, operated by lever $b$ fixed upon sleeve $d$, turned by lever $e$ operated by rod $f$, operated by roller $g$. A rocker, $h$, fixed on rocker-shaft T, supports roller $g$. Cam $i$ on shaft L imparts a direct movement to roller $g$, the return movement being effected through the agency of a spiral spring wound around sleeve $d$, and attached at one end to the sleeve, and at the other to the frame.

Provision is made for adjusting the jaws for different thicknesses of books by the rod $a$ sliding through cross-bar Z'', and lengthened or shortened by means of two nuts screwed on said rod—one above and the other below said cross-bar.

The sides of the jaws next to the backing-roller are beveled away, as is common in jaws employed in connection with a backing-roller, to properly operate on the back of the book.

The ends of the upper jaw are shaped into projections $l$, Fig. 12, Sheet 7, which transversely approach in form the figure of an inverted truncated cone, rounded slightly at the lower end, but at the top rounded into nearly a half-circle, and the plane of the bottom side of the upper jaw passes through the center of this half-circle. These projections $l$ each rest within a vertical slot in the rods Z Z', this slot being of about the same width in every part except at its top and bottom, which are rounded concavely to fit the convex round upon the projection $l$. A flat spring, $j$, attached to that side of each rod Z Z' which is nearest the rounding-rollers, continually tends to press the bottom of its respective projection $l$ against that side of the slot which is nearest the backing-roller, and thus spreading apart those edges of the jaws which are nearest the backing-roller. The purpose of this device will be explained under the description of the mode of operation.

A rod, K, Fig. 1, Sheet 1, imparts to the jaws motion in the direction of the backing-roller, and is operated in turn by rocker 33, whose lower end is fastened to rocker-shaft T, said rocker being operated by means of a roller, $m$, through the agency of cam $n$ on main shaft L. A flat spring, O, standing in the same longitudinal and vertical plane as leg 34, and at its bottom attached to the frame, its top pressing against the leg 34 of the jaw, accomplishes the return movement of the jaws toward the rounding-rollers. Rod K passes through the frame of the lower jaw, and a nut (see Sheet 8, Fig. 17) screwed on that part of it which projects beyond the front side of the jaw regulates the distance between the jaw and the backing-roller.

Figure 2:
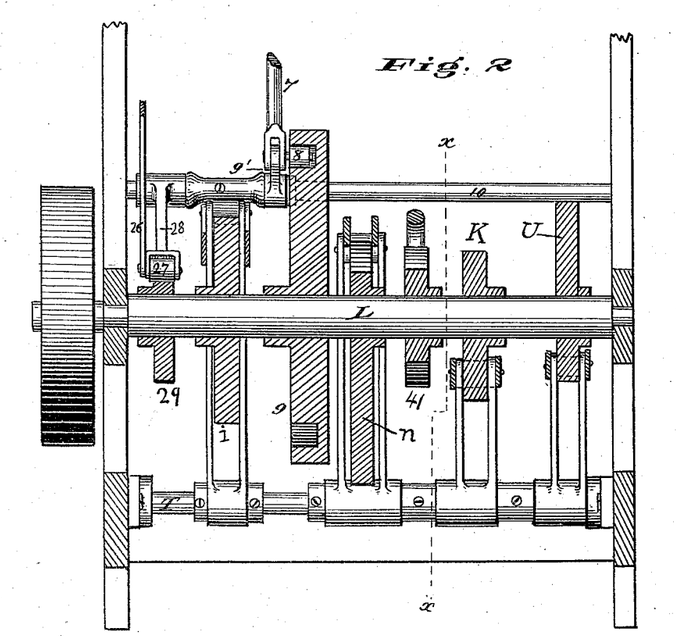
Fig. 2, Sheet 2, is a detached view of the power-wheel and cams, the cams being shown in vertical section, the section being made at the dotted lines $y\ y$ of Fig. 1.
Figures 2, 8, 19:
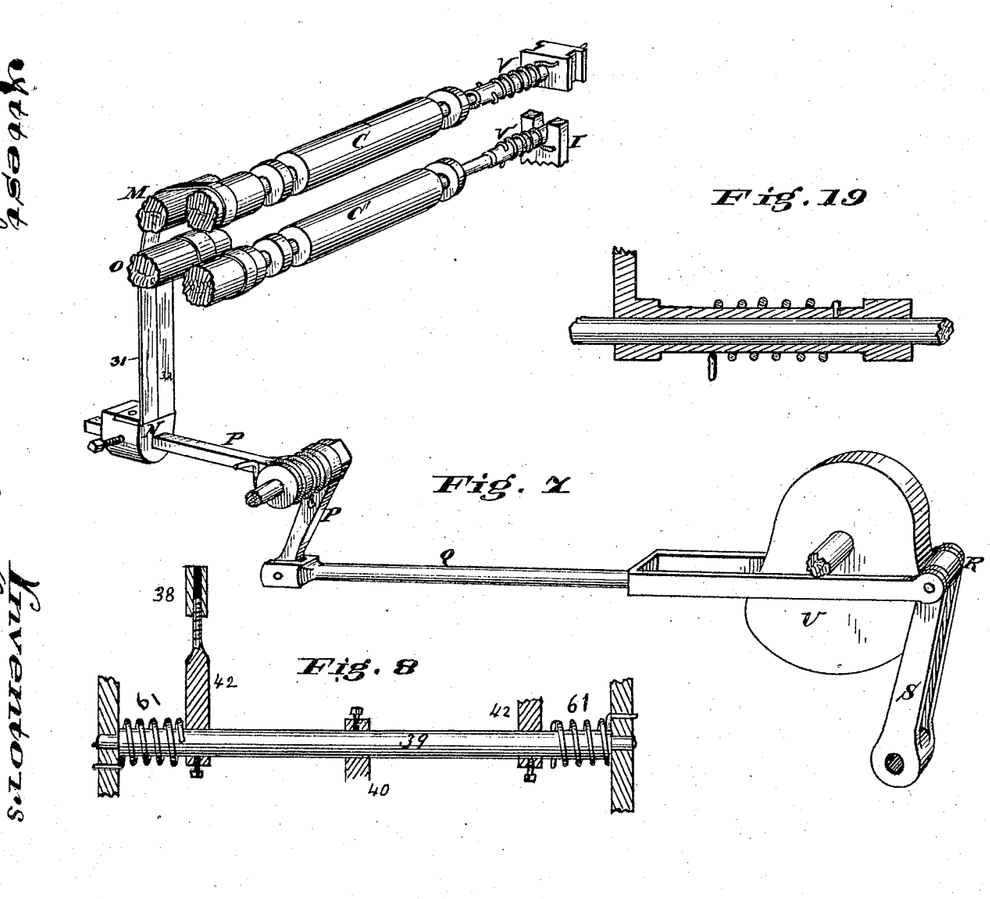
Fig. 8, Sheet 5, is a detached view of the shaft upon which the devices for holding firm the jaws during the backing operation are fastened; also showing the springs for automatically removing the hooks from the jaws, and showing in section the device for adjusting the length of the arms, to which the hooks for holding the jaws secure are attached.
Fig. 19, Sheet 5, represents a central longitudinal section of a sleeve, to which is attached the lever that operates the upper jaw, and of a shaft, to which are attached the levers that operate the upper rounding-roller.

A device for more firmly securing the jaws in position during the operation of backing the books consists of two hooks, 38, (see Fig. 1, Sheet 1, and Fig. 8, Sheet 5,) each attached to an arm, 42, boxed upon a shaft, 39, operated by a lever, 40, operated in turn by cam 41. The distance between each hook and the shaft 39 is regulated by a female screw in the hook engaging a male screw on the forward end of arm 42, and held in position by a set-screw in the hook. Spiral springs 61 62 on the shaft 39 effect the return or upward movement of the cams when permitted to do so by cam 41.

Figures 17, 18, 19:
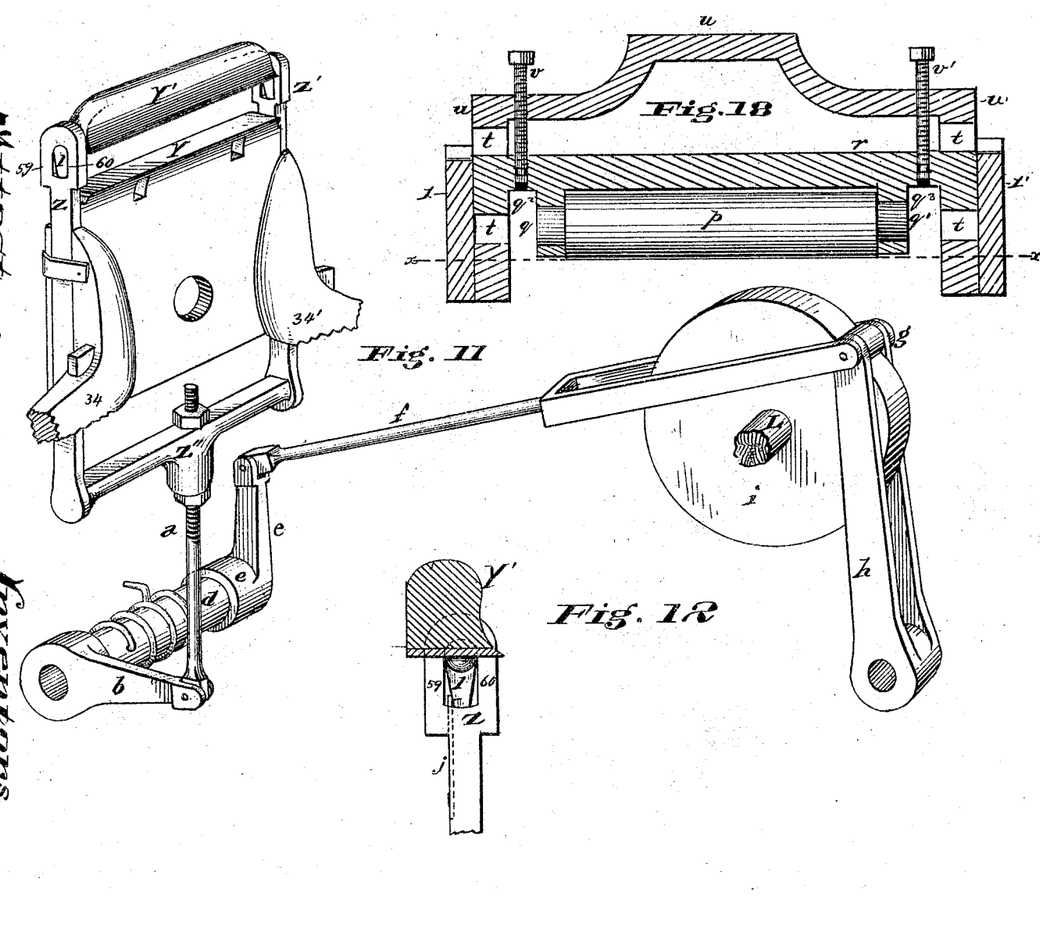
Fig. 17, Sheet 8, shows, in perspective, a device for adjusting the length of the rod which operates the jaws, thereby adjusting the distance between the jaws and backing-roller.
Fig. 18, Sheet 7, represents a central longitudinal section of the device for adjusting the radius of the arc described by the backing-roller, the roller being shown in side elevation.
Figure 17:
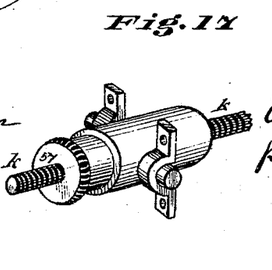

$p$ is the backing-roller, Fig. 1, Sheet 1, Fig. 18, Sheet 7, journaled at $q$ $q'$ in a frame, $r$, the ends of which frame slide upon ways $t$ in frame $u$. Frame $r$ is provided with recesses $q''$ and $q'''$ for the reception of the rear edges of rods Z Z', while the jaws are in conjunction with the backing-roller during the operation of backing. Set-screws $v$ $v'$ regulate the position of the frame upon the ways. A quarter-gear, 1, Fig. 5, Sheet 3, attached to each end of the frame $u$, oscillates, together with frame $u$, on pins $w$, which latter are journaled in seats or boxes $x$, fastened to an arm, $y$.

Figures 4, 5, 6:
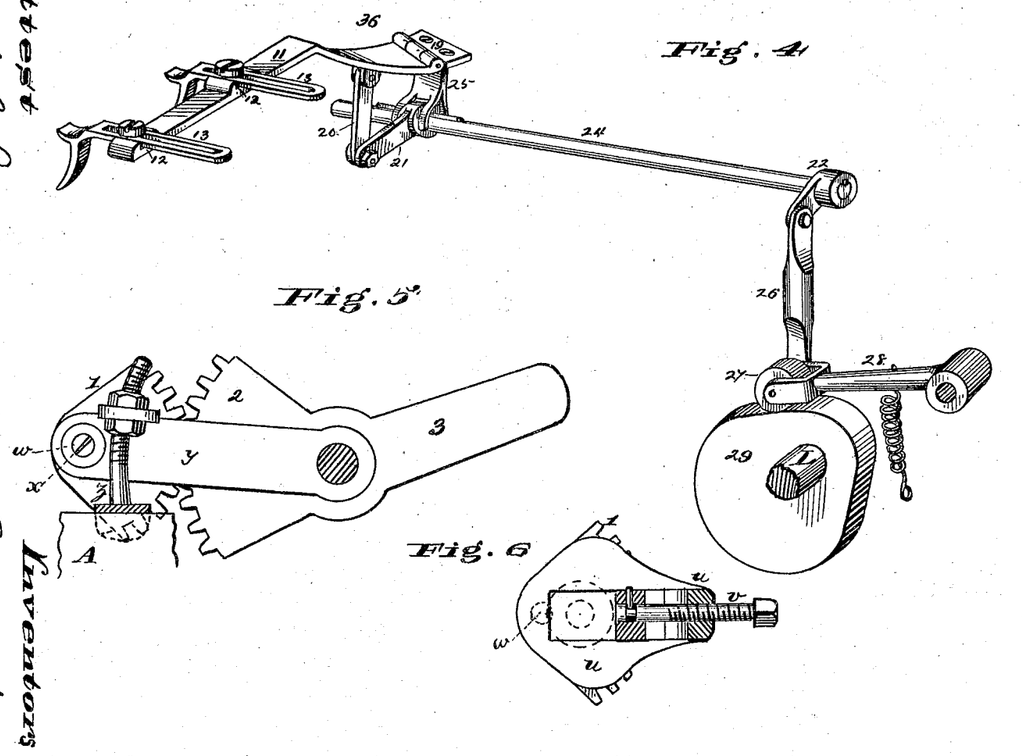
Fig. 4, Sheet 3, is a detached view, in perspective, of the guide and its operative mechanism.
Fig. 5, Sheet 3, is a detached side elevation of a device whereby the vertical elevation of the backing-roller in relation to the jaws is regulated.
Fig. 6, Sheet 3, is a detached elevation of the device whereby the length of the radius of the arc described by the backing-roller is regulated.
Figure 4A:
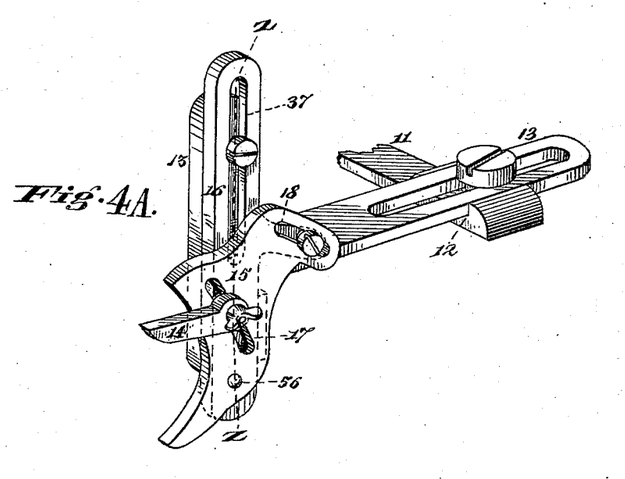
Figure 4B:
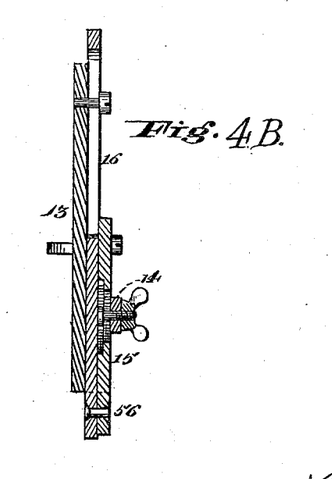

The means employed for raising and lowering the arm consist of two nuts working on a screw-thread cut upon the curved supporting-rod Z, attached to frame A, one of these nuts being above and the other below a lug attached to the arm, and sliding up and down said curved rod.

Figure 3:
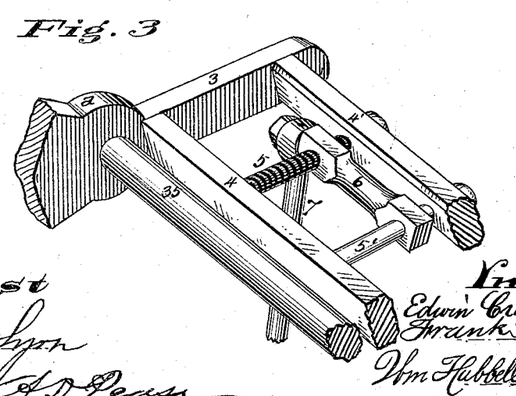
Fig. 3, Sheet 2, is a detached perspective view of a device for regulating the length of the arc described by the backing-roller.

Quarter-gear 2 2, (see Fig. 3, Sheet 2, Fig. 5, Sheet 3,) turning on a rod, 35, passed through the rear ends of arms y y, are connected with and operate a frame-work, extending behind them, consisting of an arm, 3, on each side, running directly back from said gear 2, this arm 3 being met by two bars, 4 4', running parallel to each other, a short distance apart and at right angles to the plane of the quarter-gear. Two rods, 5 5', parallel to each other, extend between shafts 4 4'. A yoke, 6, sliding on rod 5', and fixed at any point thereon by means of a screw-thread on rod 5, regulates the throw of the said frame, quarter-gear 2 2, and gear 1 1, and thus regulates the length of the arc described by the backing-roller. A rod, 7, pivoted at one end to the yoke 6, and at the other end to a roller, 8, revolving in a channel in the side of the cam 9, Sheet 1, Fig. 1, Sheet 2, Fig. 2, fixed on a driving-shaft, operates the yoke 6. A rocker, 9, at one end pivoted to a shaft, 10, and at the other end to the roller 8, holds the latter in position. The length of rod 7 is regulated by any suitable device—here by a right and left threaded nut. The guide 36, Sheet 1, Fig. 3, Fig. 4, Figs. 4ᴬ, 4ᴮ, consists of bar 11, provided on top with transverse guideways 12, in which slide the slotted adjustable pieces 13. A set-screw passes through the slot in this piece and enters the bar 11, thus enabling the piece 13 to be set upon bar 11. The adjustability of that portion of the guide which receives the back of the book is effected through the agency of the three pieces 14, 15, 16. Piece 14 is adjustable on piece 15 by a set-screw passing through the former and through slot 17 of the latter, and screwed into a nut sitting in a recess in the back side of the piece 15, and on each side of the slot 17. Piece 15, swiveled on pin 56 to piece 16, is adjustable upon the latter by means of slot 18, and a set-screw passing through said slot and screwed into piece 16. Piece 16, provided with slot 37, is adjustable in turn upon the vertical arm of piece 13, by means of a set-screw passing through said slot, and screwed into said arm. Bar 11, Sheet 3, Fig. 4, pivoted and fulcrumed at 19, is raised by rod 20, operated in turn by lever 21, and this in turn by lever 22, fixed upon shaft 24, lever 22 receiving its movement from roller 27 through the agency of rod 26. A rocker, 28, pivoted on shaft 10, holds the roller in position upon cam 29, fixed upon shaft L.

A spring, 30, attached at one end to frame A, and at the middle of rocker 28, effects the descent of the roller and the depression of the guide, when such descent is permitted by the cam. Provision is made for the movement of the guide backward and forward with the table by means of a feather upon shaft 24, the boss of the lever 21 being caused to slide upon shaft 24 by means of the yoke 25, the feather at all times affording said lever a hold-fast upon the latter shaft.

Figure 20:
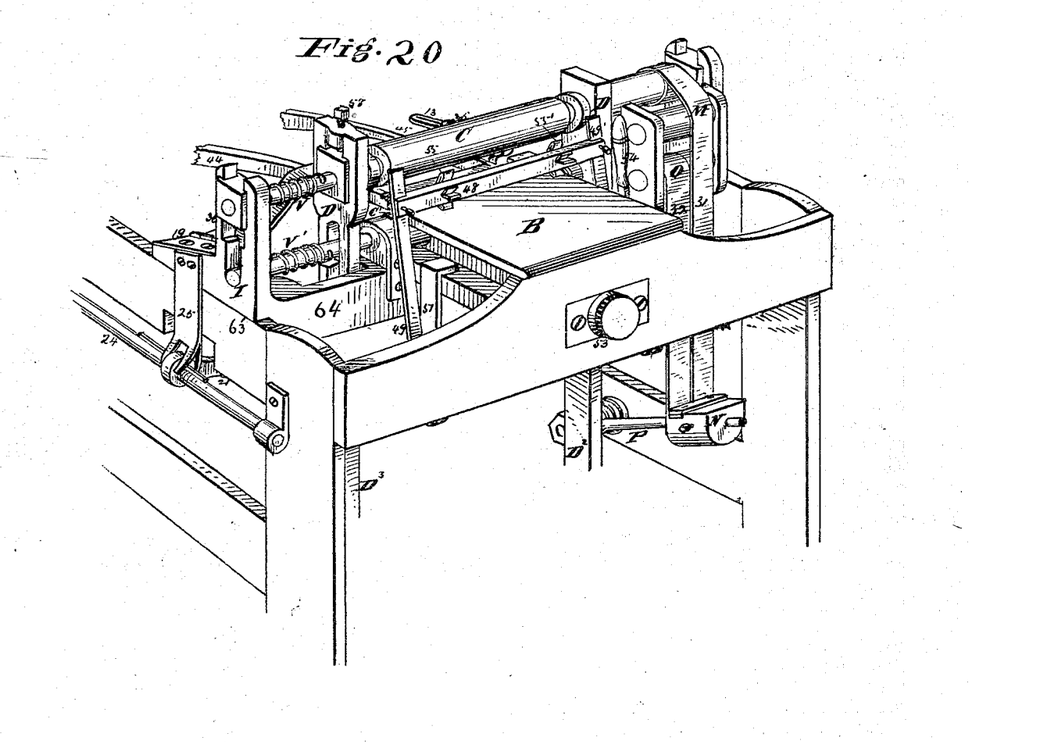
Fig. 20, Sheet 9, represents the front half of a machine embodying our improvements, and showing the sliding carriage supporting the table, rounding-rollers, and device for supplementing the guide when thick books are to be rounded.

The sliding carriage 64, Fig. 20, Sheet 9, to which are attached the rounding-rollers C C', guide 36, table B, and the device for pressing a thick book against the guide, Fig. 10, Sheet 6, slides on guideways on the top of the machine, and is set and held in proper position by means of the screw-shaft 52 engaging a female screw in the carriage, and shouldered at 53 in a journal in the front end of the frame A. A device, Fig. 1, Sheet 1, Fig. 10, Sheet 6, for pressing thick books against the guide, consists of a bar, 48, above the table B, and supported at each end by an elastic bar, 49, attached at bottom to a cross-shaft, 50, which turns in the bottom of, and is supported by, two hangers, 51, one of which is attached to each side of the table B by a set-screw. A handle, 54, fixed at its lower end on shaft 50, operates the bar 48. Springs 55, of sizes suitable for books of various thicknesses, are held to the bar 48 by any suitable device.

In the rear of roller C' is a vertical plate, 43, to which are hinged two arms, 44, parallel to each other, and extending rearward to within a short distance of the backing-roller. These arms pass through apertures in the frame of the lower jaw and conform to the arc of the circle described by the said aperture. Alongside of each arm a spring, 45, fulcrumed, near its rear end, at 46 to its arm, extends forward and terminates in a vertical plate, 47, whose functions, together with those of the arms, will be described hereafter.

Before operating the machine the operator adjusts the various parts of the guide to correspond with the thickness of the book, Figs. 4ᴬ, 4ᴮ, Sheet 4. To do this, he sets piece 14 at a distance from pin 56 equal to one-half of the thickness of the book. He then adjusts piece 16 so as to bring pin 56 opposite the center of the book, as the book lies on the table, and adjusts piece 13 on bar 11 at such a point that, after back of the book has been pressed against the guide, and the guide has been lifted, the rollers shall properly present the book to the jaws. The piece 14 performs the office of bringing the center of the book opposite the pin 56. Should there be any inequalities in the size of the joints (i. e., the edges of the back) of the book, this can be rectified by adjusting the piece 15 upon 16 by means of slot 18 and set-screw. For thin books the piece 16, instead of being curved, is made straight on its front edge. The operator next adjusts the rollers so as to give the requisite pressure upon the sides of the book by adjusting the length of rod I, Fig. 9, Sheet 6. Should the pressure of the rollers be too great upon one end of the book, he rectifies this by elevating or depressing one end of roller C by means of set-screw 58. He next adjusts the throw of the rollers by setting the sliding block N at the desired point along lever P, Sheet 5, Fig. 7. The operator next adjusts the jaws, Sheet 1, Fig. 1, Sheet 7, Fig. 11, so that they shall sufficiently pinch the book by means of the nuts on rod *a*, above and below the cross-bar Z''. The backing-roller is adjusted, Sheet 3, Fig. 5, Sheet 7, Fig. 18, by elevating or depressing it until a plane passed through the axis upon which the backing roller-frame *r* turns, (*i. e.*, the center of the pin *x*,) coincides with a plane passed through the center of the book. The operator next adjusts the backing-roller, Sheet 3, Figs. 5 and 6, Sheet 7, Fig. 18, so that it shall describe an arc of the proper radius, and he accomplishes this through the agency of the screws V V'. The length of rod K is then so regulated by its nut 57, Sheet 1, Fig. 1, Sheet 8, Fig. 17, as that the jaws shall be drawn sufficiently near to the backing-roller as to enable the latter to exercise a sufficient pressure upon the back of the book. To adapt the length of the arc described by the backing-roller to the varying thickness of the books to be backed, the operator moves the yoke *b* by means of screw 5. When the axial centers of the backing-roller and its frame *r*, and of the book, are in the same plane, the middle of the arc described by the backing-roller should be in the same plane; otherwise the backing-roller will do too much work on one edge of the back of the book and too little on the other. The roller is made to describe the desired arc by shortening or lengthening the rod 7 by means of the right and left hand nut. The operator then adjusts the hooks 38, Sheet 1, Fig. 1, so that each hook shall engage its respective lug upon the frame of the jaws during the operation of backing. As the jaws always move through a fixed length of arc, a change in the distance between them and the backing-roller will necessitate a corresponding change in the position of the sliding carriage, the operation through screw-shaft 52 causing the carriage to advance or retire along the frame as the jaws are set nearer to, or farther from, the backing-roller.

When thick books are to be rounded the operator sets the device shown in Sheet 1, Fig. 1, and Sheet 6, Fig. 10, so that when the spring 55 in bar 48 rests against the open face of the book the spring-bars 49 49' shall assume a perpendicular position. He so sets this device by moving the jaws of the hangers along their guideways on the sides of the carriage and tightening their set-screws. Bar 48 is then readjusted on the spring-bars 49 49', so that the center of the said bar 48 is in the same plane as the center of the book. The order of adjustment of the several parts of the machine may be varied to suit the exigencies of each particular occasion when the machine is used.

Among the obvious mechanical changes which might be made in the afore-described machine without altering the principle of our invention may be mentioned the following: Each rounding-roller instead of being a cylinder may be a longitudinal section of a cylinder. So, also, the lead-rollers may be dispensed with, and the combination of the straps 31 32 and rollers C C' yet be made practically operative in various ways—for example, by lengthening the lever P. If preferred, cams provided with a groove in their side, as cam 9, and operating-rollers fitting in the groove, may be substituted for the cams 29 *i n* 41 K U and their rollers. When former style of cam is employed all the springs herein employed to keep the rollers against the faces of the cams and to give the return part of the reciprocating movement of the roller-rods may be dispensed with. Again, friction-pieces may be successfully substituted for the cam-rollers.

The following is the mode in which the machine operates upon a book: The operator having placed the book on the table moves it up against the guide 36. If the book is thick the bar 48 is brought to bear against the open edge of the book. Roller C then descends and clasps the book. Thereupon the guide 36 rises out of the way, the rollers revolve and project the book rearward, at the same time rounding it. The jaws immediately grasp it. That edge of the upper jaw, which is next to the rounding-roller, impinges first upon the side of the book; but as the upper jaw continues to descend that edge of it which is nearest the backing-rollers presses harder upon the book than the other edge, and continues thus to press until the bottom of projection *l* strikes against the side 59 of the slot in the upright Z, (see Sheet 7, Figs. 11 and 12,) and causes the faces of the two jaws to assume the same angle with the respective sides of the book. The object of causing the upper jaw to thus change its point of pressure upon the book is for the following reasons, viz: It is a fact that when a book is passed through the rollers and rounded by them the back will describe an arc of a greater radius than that described by the open edge or face of the book, and those leaves nearest the center of the book will be slightly buckled at some point between the rollers and the back of the book.

By the rolling action of the upper jaw, as just described, the buckle in these leaves is smoothed out and carried into the back of the book, causing the latter to assume the shape of an arc of about the same radius as that described by the face of the book.

As the jaws first grasp the book the roller C rises, and both rollers C and C', by the aid of their actuating-springs, wind up the straps and return to their former position. The jaws then convey the book to the backing-roller, and as the book strikes the backing-roller the hooks 38 descend and hold the jaws in place. The roller, when stationary, rests at a third way up the arc which it described, and just before the book strikes the roller it begins to move, so that when the book strikes the roller the latter is moving. The roller passes four times over the surface of the back, describing four full arcs or strokes, ending at the spot in its arc where it started from. Immediately before the roller comes to rest the hooks 38 rise and the book leaves the roller.

Immediately after the jaws with their book are under motion toward the rounding-rollers the upper jaw rises, releasing its hold on the book. If the book is thin or limp and bends by its own weight, the arms 44 will support it. In the meantime a second book has been placed between the rounding-roller and against the guide, the guide has risen, and the rollers having rounded this book are presenting it for the jaws to grasp the side of the book next the back, in the meantime resting upon the vertical plates 47 of the springs 45. As the first book is returned its front strikes the back of the second, and the latter, being held firmly between the rollers, pushes the first book out from between the jaws, ready for the operator to grasp it. Should he fail to grasp it, it falls upon the arms 44 in readiness to be removed. The jaws then grasp the second book in the same manner as they did the first. It is well here to remark that the lower jaw at the latter end of its return movement pushes down the vertical plates 47, and, substituting itself in their place, slides easily under the book, placing itself in position for grasping it.

When thick books are to be rounded and backed, the device shown in Fig. 10, Sheet 6, becomes of value. That size and curvature of spring best adapted to aid the guide in starting the round of the book is selected and inserted. The absence of the springs 55 does not, however, destroy the utility of the bar 48.

What we claim as new, and desire to secure by Letters Patent, is—

1. The method of rounding books, consisting in passing the pile of sheets or signatures between the rollers C C′, having a positive rotary motion, substantially as and for the purposes specified.

2. In combination with the rollers C C′, the straps 31 and 32, for imparting to said rollers a positive rotary motion for rounding books, and at the same time permitting said rollers to be more or less separated according to the thickness of the book passed between them, and also to prevent loss of motion in reversing the rotary movement of the rollers.

3. In combination with the rollers C C′, the springs V V′ for rewinding the straps, and returning the rollers to the position they held before being revolved by the straps.

4. In combination with the rollers C C′, the straps 31 and 32, and springs V V′, substantially as and for the purposes specified.

5. In combination with the sliding block N, and the straps 31 and 32, employed to impart positive motion to the rollers C C′, the lever P, for receiving and imparting a reciprocating movement to the block N.

6. The combination of the rollers C C′, straps 31 32, sliding block N, lever P, and its spring-rod Q, roller R, cam U, rocker S.

7. The combination of roller C, bars D D¹, rods D² D³, levers F F′, shaft G, and its spring G′, lever H, adjustable rod I, roller W, cam K, and rocker X, for the purpose of raising and lowering roller C, and of regulating the amount of elevation and depression of roller C in relation to C′.

8. A guide for guiding a book by its back in combination with rollers for rounding the book.

9. The movable guide 36, placed between the rollers C C′ and jaws, for holding the book in position for the said rollers to grasp it.

10. The combination of the arm 11 of the guide and the slotted adjustable arms for regulating the position of the book at the time of being grasped by the rounding-rollers.

11. The combination of the pieces 13, 16, 15, and 14 of the guide for bringing the center of the book opposite the center of the stud 56 of piece 15.

12. In combination with the pieces 15 and 14, the yielding vertical plates 47 and the bar 48, Fig. 10, for partially rounding the book.

13. The combination of the movable guide 36 and the rollers C C′, for the purposes specified.

14. The combination of the guide 36, rod 20, lever 21, shaft 24, lever 22, rod 26, roller 27, rocker 28, and cam 29.

15. The combination of the springs 55 and bar 48, Fig. 10, as and for the purpose set forth.

16. The combination of the rollers C C′, arms 44, and jaws Y Y′, substantially as and for the purposes set forth.

17. The combination of the rollers C C′, arms 44, provided with yielding plates 47 and jaws Y Y′, substantially as specified.

18. The combination of the rollers C C′, guide 36, yielding plates 47, and jaws Y Y′, substantially as specified.

19. The combination of rollers C C′, guide 36, arms 44, provided with yielding plates 47, and jaws Y Y′.

20. The combination of the upper jaw Y′, provided with projections l, rods Z Z′, springs j, and lower jaw Y, as and for the purposes specified.

21. The combination of jaws Y Y′, rods Z Z′, cross-head Z″, adjustable rod a, levers b, sleeve d, lever e, rod f, roller g, rocker h, and cam i, as and for the purposes set forth.

22. The jaws for conveying the book to and from the backing-roller, in combination with the adjustable rod K, lever 33, roller m, cam n, for drawing the jaws to the backing-roller.

23. In combination with the backing-roller and the jaws for conveying the book to and from the backing-roller, the hooks 38, adjusted and operated substantially as and for the purposes set forth.

24. In combination with rack-segment 2 and frame 3 3' 4 4', the devices for regulating the length of the arc described by the backing-roller, consisting of screw 5, rod 5', and yoke 6.

25. In combination with rack-segment 2 and frame 3 3' 4 4', the device for regulating the position of the arc described by the backing-roller, consisting of adjustable rod 7, substantially as set forth.

26. The combination of rack-segment 2, frame 3 3' 4 4', yoke 6, screw 5, rod 5', adjustable rod 7, roller 8, cam 9, and rocker 9', for the purposes specified.

27. The combination of the frame U, roller-frame $r$, provided with recesses $q^2 q^3$, and the jaw-rods Z, substantially as and for the purposes specified.

28. The arms $y$, connected to the pins $w$ and to shaft 35, in combination with screws Z and set-nuts, for the purpose of raising and lowering the backing-rollers, substantially as set forth.

29. The combination of the rounding-rollers and the backing-roller and the jaws, substantially as and for the purposes set forth.

EDWIN CRAWLEY.
FRANK THOMAS.

In presence of—
D. P. KENNEDY,
R. J. GANETTE.